(12) United States Patent
Furuta et al.

(10) Patent No.: US 11,666,978 B2
(45) Date of Patent: Jun. 6, 2023

(54) WIRE ELECTRICAL DISCHARGE MACHINE AND CONTROL METHOD

(71) Applicant: FANUC CORPORATION, Minamitsuru-gun (JP)

(72) Inventors: Tomoyuki Furuta, Minamitsuru-gun (JP); Yasuo Nakashima, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 278 days.

(21) Appl. No.: 17/011,107

(22) Filed: Sep. 3, 2020

(65) Prior Publication Data
US 2021/0069809 A1 Mar. 11, 2021

(30) Foreign Application Priority Data
Sep. 9, 2019 (JP) .............................. JP2019-163664

(51) Int. Cl.
*B23H 1/02* (2006.01)
*B23H 7/06* (2006.01)
*B23H 7/20* (2006.01)

(52) U.S. Cl.
CPC .............. *B23H 1/024* (2013.01); *B23H 7/20* (2013.01); *B23H 2600/10* (2013.01)

(58) Field of Classification Search
CPC .......... B23H 1/024; B23H 7/20; B23H 7/065; B23H 2600/10; B23H 7/04; G05B 2219/45043
See application file for complete search history.

(56) References Cited

U.S. PATENT DOCUMENTS

| 3,617,680 A * | 11/1971 | Grosskopf | B23H 3/02 |
| | | | 219/69.19 |
| 2003/0098294 A1* | 5/2003 | Goto | B23H 7/065 |
| | | | 219/69.12 |

(Continued)

FOREIGN PATENT DOCUMENTS

| JP | S61-203221 A | 9/1986 |
| JP | 2003-205426 A | 7/2003 |

(Continued)

OTHER PUBLICATIONS

Machine translation of Japan Patent No. 2003205426A, Sep. 2022 (Year: 2022).*

(Continued)

*Primary Examiner* — Geoffrey S Evans
(74) *Attorney, Agent, or Firm* — McGinn I.P. Law Group, PLLC.

(57) ABSTRACT

A wire electrical discharge machine includes: a voltage application unit for repeatedly applying a voltage to an electrode gap between the workpiece and the wire electrode at a predetermined cycle; a switching element connected in parallel with the electrode gap and configured to short-circuit the electrode gap; and a control section for controlling the switching element so as to short-circuit the electrode gap in a pause period during which the voltage is not applied. The control section adjusts a short-circuiting period in which the electrode gap is short-circuited according to the machining shape specified by a machining program.

20 Claims, 10 Drawing Sheets

(56) References Cited

U.S. PATENT DOCUMENTS

2012/0228268 A1* 9/2012 Morita .................. B23H 1/022
　　　　　　　　　　　　　　　　　　　　　　　219/69.11
2015/0239055 A1* 8/2015 Niu ....................... B23H 7/065
　　　　　　　　　　　　　　　　　　　　　　　219/69.12
2018/0200815 A1* 7/2018 Matsunaga ............. B23H 7/20

FOREIGN PATENT DOCUMENTS

JP　　　　2003205426 A　*　7/2003
WO　WO 2012/114524 A1　　8/2012

OTHER PUBLICATIONS

Extended European Search Report dated Mar. 15, 2021 for European Patent Application No. 20195209.0-1017.

* cited by examiner

FIG. 4
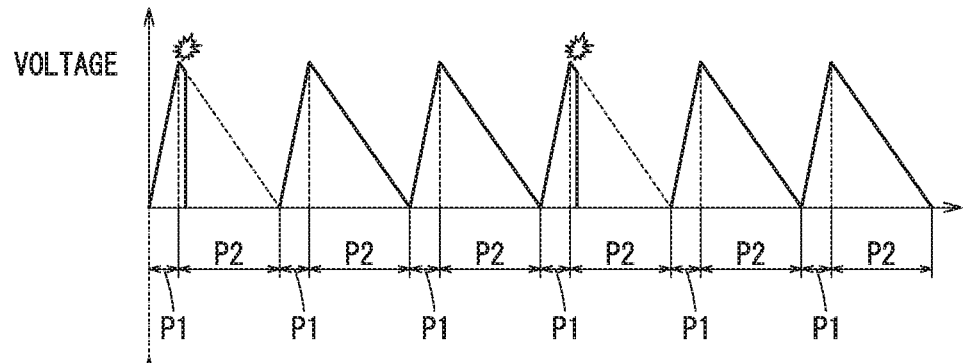
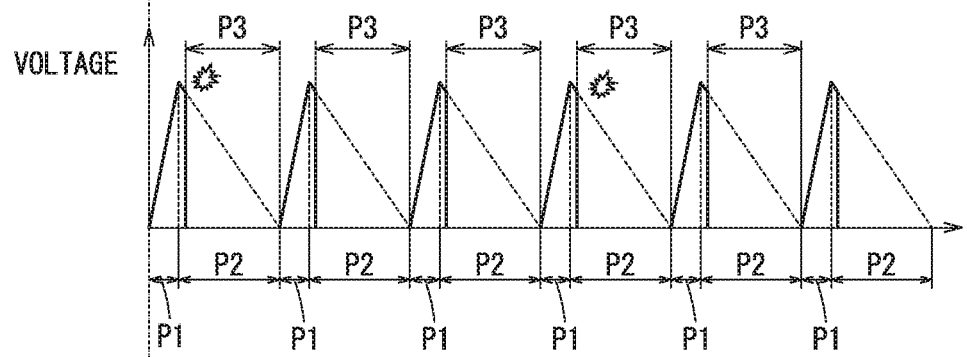

FIG. 5
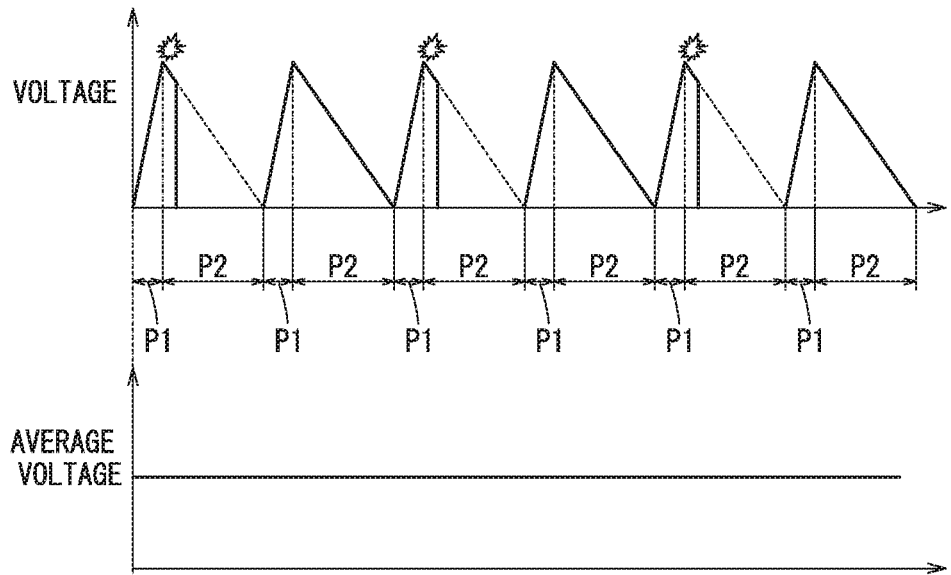
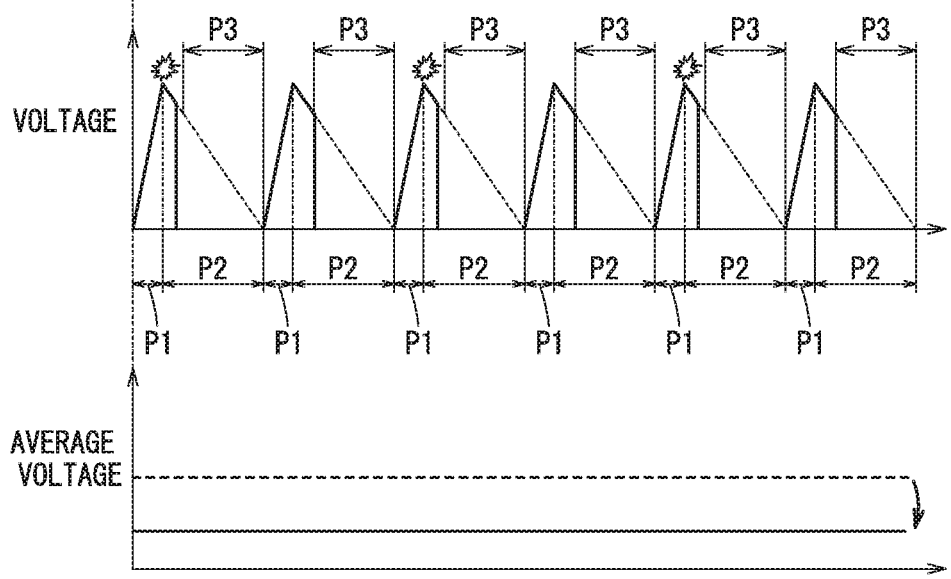

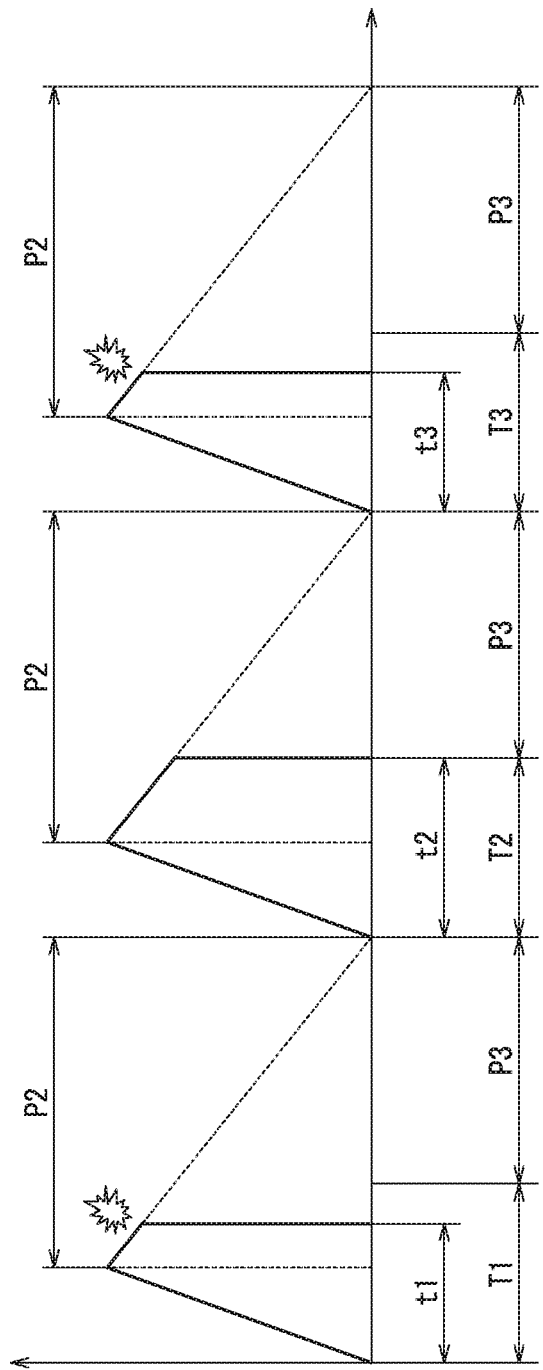

WIRE ELECTRICAL DISCHARGE MACHINE AND CONTROL METHOD

CROSS-REFERENCE TO RELATED APPLICATION

This application is based upon and claims the benefit of priority from Japanese Patent Application No. 2019-163664 filed on Sep. 9, 2019, the contents of which are incorporated herein by reference.

BACKGROUND OF THE INVENTION

Field of the Invention

The present invention relates to a wire electrical discharge machine for performing electrical discharge machining on a workpiece using a wire electrode as well as relating to a control method of the same.

Description of the Related Art

A wire electrical discharge machine generates electrical discharge by repeatedly applying a voltage at a predetermined cycle to the electrode gap between a workpiece and a wire electrode. In this process, when the facing area at the electrode gap between the wire electrode and the workpiece decreases, there are cases in which no electrical discharge occurs even if the voltage is applied. When no discharge is generated, the voltage applied to the electrode gap between the workpiece and the wire electrode remains, so that the average voltage applied per unit time to the electrode gap tends to increase.

Japanese Laid-Open Patent Publication No. 2003-205426 discloses a power supply for electrical discharge machines, which includes a first switching element that causes electric charge to flow through the electrode gap between a workpiece and a wire electrode to generate a pulsed electrical discharge, and a second switching element that is connected in parallel with the electrode gap to short-circuit the electrode gap.

SUMMARY OF THE INVENTION

In the above Japanese Laid-Open Patent Publication No. 2003-205426, since the electrode gap between the workpiece and the wire electrode is short-circuited, the average voltage applied per unit time to the electrode gap tends to be lowered. In this case, when performing electrical discharge machining on a workpiece, the frequency of absence of electrical discharge to occur differs depending on the machining shape of the workpiece resulting from the electrical discharge machining.

For example, when machining an outer corner, i.e., the outside of a corner with an angle of less than 180 degrees, the facing area at the electrode gap between the workpiece and the wire electrode becomes smaller, so that discharge probability tends to lower. On the other hand, when machining an inner corner, i.e., the inside of a corner having an angle of less than 180 degrees, the facing area at the electrode gap between the workpiece and the wire electrode becomes larger, so that discharge probability tends to increase.

Thus, the average voltage applied per unit time to the electrode gap between the workpiece and the wire electrode varies. When the average voltage increases, the electrostatic attraction force occurring at the electrode gap between the wire electrode and the workpiece increases, so that the wire electrode moves closer to the workpiece than in the case of the original path, hence being liable to result in excessive machining on the workpiece. On the other hand, when the average voltage decreases, the electrostatic attraction force occurring at the electrode gap between the wire electrode and the workpiece decreases, so that the wire electrode moves farther from the workpiece than in the case of the original path, hence being liable to result in insufficient machining. That is, the machining accuracy tends to deteriorate.

It is therefore an object of the present invention to provide a wire electrical discharge machine and a control method, capable of stabilizing the average voltage applied per unit time to the electrode gap between the wire electrode and the workpiece.

A first aspect of the present invention resides in a wire electrical discharge machine for performing electrical discharge machining on a workpiece using a wire electrode, including:

a voltage application unit configured to repeatedly apply a voltage to an electrode gap between the workpiece and the wire electrode at a predetermined cycle;

a switching element connected in parallel with the electrode gap and configured to short-circuit the electrode gap; and a control section configured to control the switching element so as to short-circuit the electrode gap in a pause period during which the voltage is not applied, wherein the control section is configured to adjust a short-circuiting period in which the electrode gap is short-circuited according to a machining shape specified by a machining program.

A second aspect of the present invention resides in a wire electrical discharge machine for performing electrical discharge machining on a workpiece using a wire electrode, including:

a voltage application unit configured to repeatedly apply a voltage to an electrode gap between the workpiece and the wire electrode at a predetermined cycle;

a switching element connected in parallel with the electrode gap and configured to short-circuit the electrode gap;

a voltage sensor configured to detect the voltage applied to the electrode gap; and, a control section configured to control the switching element so as to short-circuit the electrode gap in a pause period during which the voltage is not applied, wherein the control section is configured to adjust a short-circuiting period in which the electrode gap is short-circuited according to the average voltage per unit time measured using the voltage sensor.

A third aspect of the present invention resides in a control method of a wire electrical discharge machine for performing electrical discharge machining on a workpiece using a wire electrode, including:

a voltage application step of repeatedly applying a voltage to an electrode gap between the workpiece and the wire electrode at a predetermined cycle; and, a control step of controlling a switching element connected in parallel with the electrode gap, so as to short-circuit the electrode gap in a pause period during which the voltage is not applied, wherein the control step adjusts a short-circuiting period in which the electrode gap is short-circuited according to the machining shape specified by a machining program.

A fourth aspect of the present invention resides in a control method of a wire electrical discharge machine for performing electrical discharge machining on a workpiece using a wire electrode, including:

a voltage application step of repeatedly applying a voltage to an electrode gap between the workpiece and the wire electrode at a predetermined cycle; and, a control step of controlling a switching element connected in parallel with the electrode gap, so as to short-circuit the electrode gap in a pause period during which the voltage is not applied, wherein the control step adjusts a short-circuiting period in which the electrode gap is short-circuited according to the average voltage per unit time measured using a voltage sensor configured to detect the voltage applied to the electrode gap.

According to the aspects of the present invention, it is possible to stabilize the average voltage applied per unit time to the electrode gap.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a diagram showing a temporal change of a voltage when the machining shape assumes an outer corner;

FIG. 5 is a diagram showing a temporal change of a voltage when the machining shape assumes a straight line;

DESCRIPTION OF THE PREFERRED EMBODIMENTS

The present invention will be detailed hereinbelow by describing a preferred embodiment with reference to the accompanying drawings.

Figure 1:
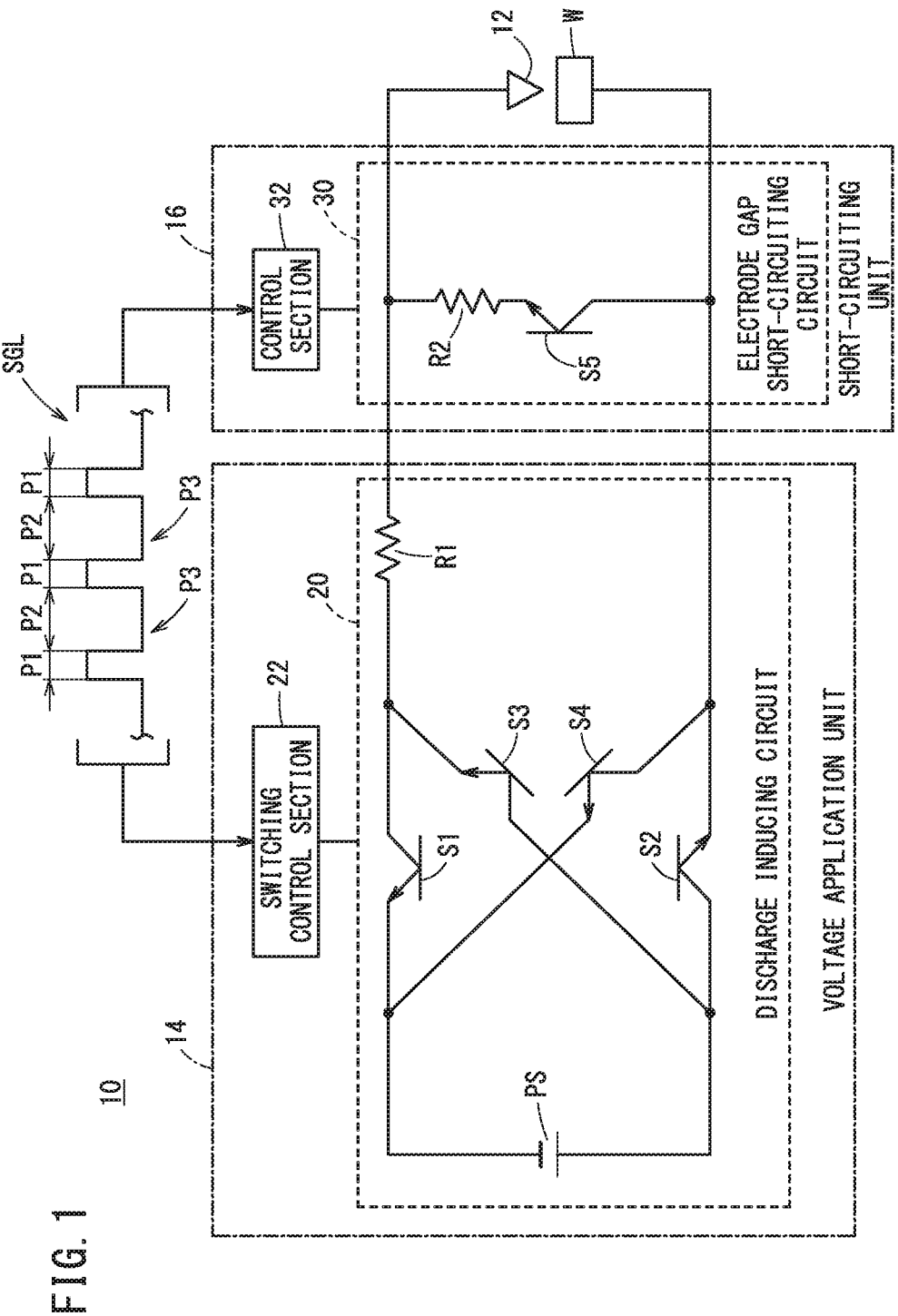
FIG. 1 is a diagram showing a partial configuration of a wire electrical discharge machine.

Referring to FIG. 1, a wire electrical discharge machine 10 will be described. The wire electrical discharge machine 10 is a processing machine that performs electrical discharge machining on a workpiece W using a wire electrode 12. The wire electrical discharge machine 10 generates electrical discharge by application of a voltage to an electrode gap between the workpiece W and the wire electrode 12 while moving the wire electrode 12 relative to the workpiece W immersed in a liquid. The wire electrical discharge machine 10 includes a voltage application unit 14 and a short-circuiting unit 16.

The voltage application unit 14 repeatedly applies a voltage to the electrode gap between the workpiece W and the wire electrode 12 at a predetermined cycle. The voltage application unit 14 includes a discharge inducing circuit 20 and a switching control section 22.

The discharge inducing circuit 20 includes a direct current (DC) power supply PS, a plurality of switching elements S1 to S4, and a current limiting resistor R1. The DC power supply PS has a positive terminal connected to the workpiece W and a negative terminal connected to the wire electrode 12. The switching element S1 is provided between the negative terminal of the DC power supply PS and the wire electrode 12, and the switching element S2 is provided between the positive terminal of the DC power supply PS and the workpiece W. The switching element S3 has an emitter connected to a node between the collector of the switching element S1 and the wire electrode 12, and a collector connected to a node between the collector of the switching element S2 and the positive terminal of the DC power supply PS. The switching element S4 has an emitter connected to a node between the emitter of the switching element S1 and the negative terminal of the DC power supply PS, and a collector connected to a node between the emitter of the switching element S2 and the workpiece W. The current limiting resistor R1 is connected in series to the wire electrode 12, the switching element S1 and the switching element S3.

The configuration of the discharge inducing circuit 20 shown in FIG. 1 is a mere example, and the discharge inducing circuit 20 is not limited to the configuration shown in FIG. 1. Further, in FIG. 1, as the multiple switching elements S1 to S4, the same kind of elements are adopted, but different kinds may be used.

The switching control section 22 controls each of the multiple switching elements S1 to S4 in the discharge inducing circuit 20, and is connected to the gate of each of the switching elements S1 to S4. A pulse signal SGL which repeats rectangular pulses at predetermined intervals is supplied to the switching control section 22. The switching control section 22 alternately repeats a first switching state and a second switching state at predetermined intervals based on the pulse signal SGL.

The first switching state is a state in which a pair of switching elements S1 and S2 are turned on and a pair of switching elements S3 and S4 are turned off. In the first switching state, the voltage of the DC power supply PS is applied to the electrode gap between the workpiece W and the wire electrode 12, so that a current flows from the workpiece W toward the wire electrode 12 in accordance with the applied voltage, whereby positive polarity discharge is generated.

On the other hand, the second switching state is a state in which a pair of switching elements S1 and S2 are turned off and a pair of switching elements S3 and S4 are turned on. In the second switching state, the voltage of the DC power supply PS is applied to the electrode gap between the workpiece W and the wire electrode 12, so that a current flows from the wire electrode 12 toward the workpiece W in accordance with the applied voltage, whereby negative polarity discharge is generated.

Here, the pair of switching elements S3 and S4 may be omitted. When the pair of switching elements S3 and S4 are omitted, the switching control section 22 repeats the first switching state at predetermined intervals based on the pulse signal SGL. In this case, only positive discharge occurs. Generally, when the workpiece W is immersed in oil or the like, machining by positive discharge is used. When the workpiece W is immersed in water or the like, both positive polarity discharge machining and negative polarity discharge machining are used.

As described above, the switching control section 22 applies voltage during a time period in which a pulse of the pulse signal SGL exists, and stops application of voltage during a time period between the pulses of the pulse signal SGL. That is, the time period in which the pulse is present on the pulse signal SGL corresponds to an application period P1 in which a voltage is applied to the electrode gap, and the time period between the pulses on the pulse signal SGL corresponds to a pause period P2 during which no voltage is applied to the electrode gap.

The short-circuiting unit 16 short-circuits the electrode gap in the pause period P2. The short-circuiting unit 16 includes an electrode gap short-circuiting circuit 30 and a control section 32.

The electrode gap short-circuiting circuit 30 is provided between the workpiece W and the wire electrode 12, and the discharge inducing circuit 20, and includes a switching element S5 and a discharge resistor R2. The switching element S5 is connected in parallel with the electrode gap between the workpiece W and the wire electrode 12, and has a collector thereof connected to the workpiece W and an emitter thereof connected to the wire electrode 12. The discharge resistor R2 is connected in series with the switching element S5 and the wire electrode 12.

The configuration of the electrode gap short-circuiting circuit 30 shown in FIG. 1 is an example, and the electrode gap short-circuiting circuit 30 is not limited to the configuration shown in FIG. 1. Further, in FIG. 1, the switching element S5 employs a transistor, but a device (such as a MOSFET) other than a transistor may be employed. In the case where the discharge inducing circuit 20 generates bipolar electrical discharges, an electrode gap short-circuiting circuit 30 may be configured with a P-type MOSFET and an N-type MOSFET connected in series so that no current (charge) will flow through the parasitic diodes of the FETs.

Figure 2:
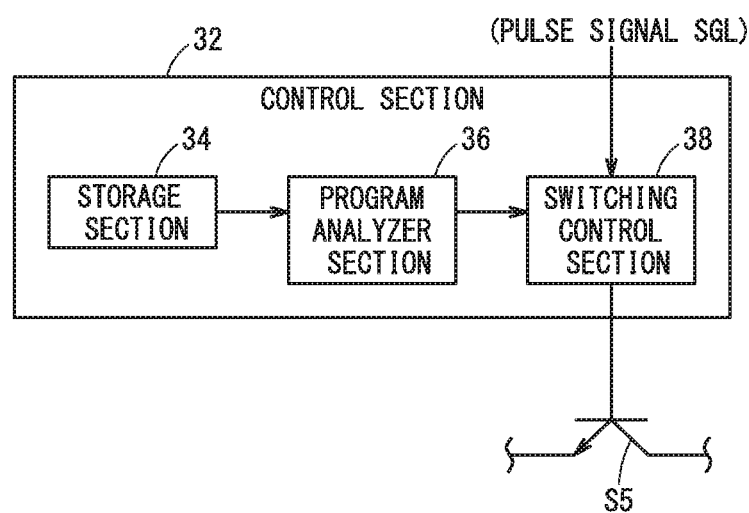
FIG. 2 is a diagram showing a configuration of a control section.

As shown in FIG. 2, the control section 32 includes a storage section 34, a program analyzer section 36, and a switching control section 38. The storage section 34 stores a machining program for electrical discharge machining of the workpiece W. The program analyzer section 36 analyzes the machining program stored in the storage section 34 in response to a machining start command, and outputs the analysis result to the switching control section 38.

The switching control section 38 controls the switching element S5 in the electrode gap short-circuiting circuit 30, and is connected to the gate of the switching element S5. A pulse signal SGL synchronized with the pulse of the pulse signal SGL input to the switching control section 22 of the voltage application unit 14 is input to the switching control section 38. The switching control section 38 controls the switching element S5 based on the pulse signal SGL.

Figure 3:
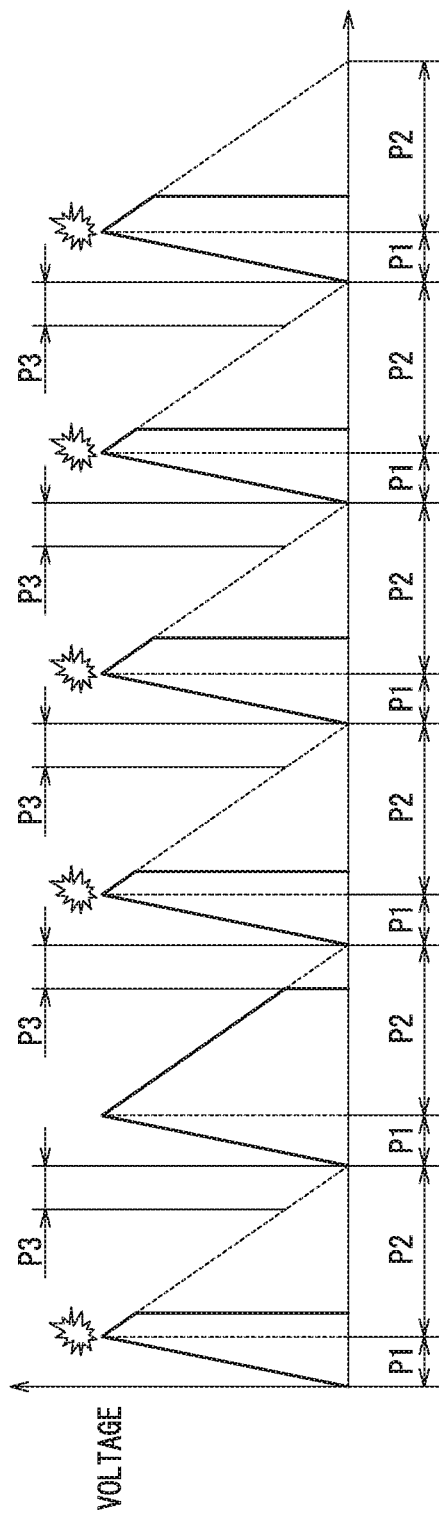
FIG. 3 is a diagram showing a temporal change of a voltage applied to the electrode gap.

Now, the switching operation of the switching control section 38 will be described with reference to FIG. 3. FIG. 3 shows a temporal change of a voltage applied to the electrode gap between the workpiece W and the wire electrode 12.

The switching control section 38 recognizes the application period P1 and the pause period P2 based on the pulse signal SGL. The switching control section 38 sets a part of the pause period P2 as a short-circuiting period P3 in which the electrode gap between the workpiece W and the wire electrode 12 is short-circuited, and turns on the switching element S5 (FIG. 1) during the set short-circuiting period P3. On the other hand, the switching control section 38 turns off the switching element S5 (FIG. 1) during the pause period P2 excluding the short-circuiting period P3 and during the application period P1. When the switching element S5 is turned on, the electrode gap between the workpiece W and the wire electrode 12 is short-circuited, and as a result, the electric charge accumulated in the electrode gap flows and is discharged through the discharge resistor R2 (FIG. 1).

The voltage applied to the electrode gap between the workpiece W and the wire electrode 12 in the application period P1 gradually decreases as time passes in the pause period P2 right after the application period P1, and instantly drops and almost dissipates when discharge occurs. Herein, when no discharge occurs as in the second pause period P2 in FIG. 3, the voltage continues to decrease gradually, so that the voltage across the electrode gap tends to stay high at the start of the next application period P1 after the pause period P2 in which no discharge occurred. In the present embodiment, the electric charge accumulated in the electrode gap is discharged from the discharge resistor R2 (FIG. 1) in the short-circuiting period P3 set within the pause period P2, so that it is possible to decrease the voltage that would remain across the electrode gap at the start of the application period P1 subsequent to the pause period P2 in which no discharge occurred.

In this way, the switching control section 38 removes the electric charge accumulated in the electrode gap between the workpiece W and the wire electrode 12 in the short-circuiting period P3 set within the pause period P2, so that it is possible to inhibit the voltage from remaining in the electrode gap even if no electrical discharge occurs. As a result, the average voltage applied per unit time to the electrode gap between the workpiece W and the wire electrode 12 can be stabilized.

In this process, the frequency at which electrical discharge does not occur (non-discharge frequency) differs depending on the machining shape of the workpiece W subjected to electrical discharge machining. To deal with such difference, the switching control section 38, based on the analysis of the machining program output from the program analyzer section 36, recognizes the machining shape specified by the machining program and adjusts the short-circuiting period P3 in accordance with the recognized machining shape.

Figure 6:
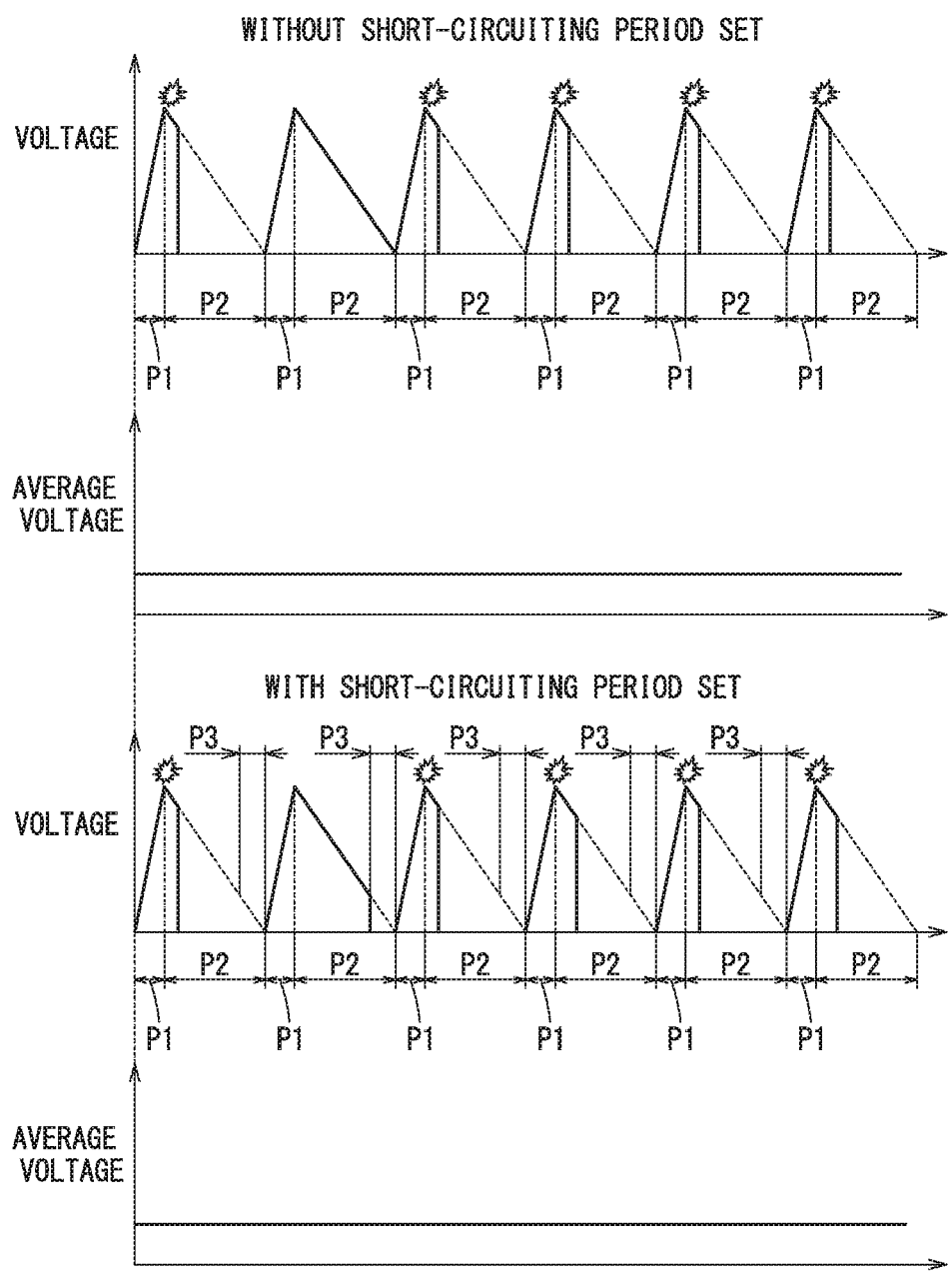
FIG. 6 is a diagram showing a temporal change of a voltage when the machining shape assumes an inner corner.

Referring now to FIGS. 4 to 6, adjustment of the short-circuiting period P3 will be described. FIG. 4 shows a temporal change of the voltage when the machining shape assumes an outer corner (a convex corner). FIG. 5 shows a temporal change of the voltage when the machining shape assumes a straight line. FIG. 6 shows a temporal change of the voltage when the machining shape assumes an inner corner (a concave corner). Here, when the machining shape assumes an outer corner, the surface of the workpiece W will be finished so as to be an arc that curves outward, whereas when the machining shape assumes an inner corner, the surface of the workpiece W will be finished so as to be an arc that curves inward.

Generally, the non-discharge frequency tends to be higher when the machining shape is an outer corner (convex corner) (FIG. 4) than when it is a straight line (FIG. 5). To cope with this, the switching control section 38 lengthens the short-circuiting period P3 (FIG. 4) when the machining shape is an outer corner, compared to the short-circuiting period P3 (FIG. 5) when the processed shape is a straight line. As a result, even if the non-discharge frequency varies between the case where the machining shape is a straight line and the case where the machining shape is an outer corner, the average voltage per unit time applied to the electrode gap between the workpiece W and the wire electrode 12 can be stabilized.

Also, in general, the non-discharge frequency in the case of an inner corner (concave corner) (FIG. 6) tends to be lower than that in the case where the machining shape is a straight line (FIG. 5). To cope with this, the switching control section 38 shortens the short-circuiting period P3 (FIG. 6) when the machining shape is an inner corner, compared to the short-circuiting period P3 (FIG. 5) when the machining shape is a straight line. As a result, even if the non-discharge frequency varies between the case where the machining shape is a straight line and the case where the machining shape is an inner corner, the average voltage per unit time applied to the electrode gap between the workpiece W and the wire electrode 12 can be stabilized.

As described above, the switching control section 38 adjusts the short-circuiting period P3 according to the machining shape specified by the machining program, so that the average voltage per unit time applied to the electrode gap between the workpiece W and the wire electrode 12 can be stabilized. The stabilization of the average voltage makes it possible to stabilize the electrostatic attraction force between the wire electrode 12 and the workpiece W, and thus it is possible to prevent deterioration of machining accuracy.

Figure 7:
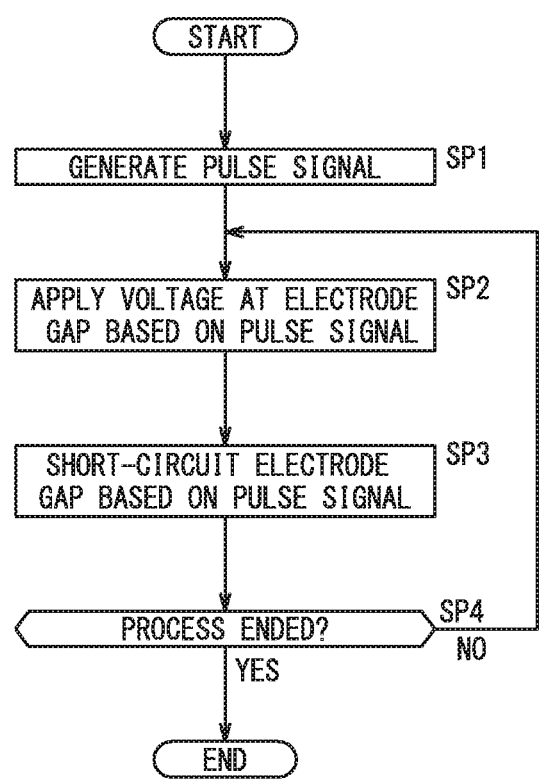
FIG. 7 is a flowchart showing a flow of a process of a wire electrical discharge machine.

Referring next to FIG. 7, the control method of the wire electrical discharge machine 10 will be described. FIG. 7 is a flowchart showing a processing flow of the wire electrical discharge machine 10. The process of the wire electrical discharge machine 10 proceeds to step SP1 in response to the operator's processing start operation.

At step SP1, the wire electrical discharge machine 10 generates a pulse signal SGL, and outputs the generated pulse signal SGL to the voltage application unit 14 and the short-circuiting unit 16. When the pulse signal SGL starts to be output to the voltage application unit 14 and the short-circuiting unit 16, the control of the wire electrical discharge machine 10 proceeds to step SP2.

At step SP2, the voltage application unit 14 of the wire electrical discharge machine 10 repeatedly applies a voltage to the electrode gap between the workpiece W and the wire electrode 12 at a predetermined cycle based on the pulse signal SGL. The control of the wire electrical discharge machine 10 proceeds to step SP3 while the voltage application unit 14 is performing the application process.

At step SP3, the short-circuiting unit 16 of the wire electrical discharge machine 10 short-circuits the electrode gap in each of the pause periods P2 that occur over time based on the pulse signal SGL. That is, the switching control section 38 of the short-circuiting unit 16 sets the length of the short-circuiting period P3 according to the machining shape specified by the machining program, and controls the switching element S5 so as to turn on the switching element S5 during the set short-circuiting period P3 and turn off the switching element S5 during a period other than the short-circuiting period P3.

For example, when the wire electrode 12 moves straight relative to the workpiece W according to the machining program, the switching control section 38 sets the short-circuiting period P3 corresponding to the straight line within each of the pause periods P2 that occur during the straight movement, and short-circuits the electrode gap in each of the set short-circuiting periods. When, for example, the relative movement of the wire electrode 12 relative to the workpiece W changes from the straight movement to an outer (convex) curve movement, the switching control section 38 sets the short-circuiting period P3 corresponding to the outer corner within each of the pause periods P2 that occur during the relative movement along the outer corner, and short-circuits the electrode gap in each of the set short-circuiting periods.

With the short-circuiting process of the short-circuiting unit 16 being executed, the control of the wire electrical discharge machine 10 proceeds to step SP4.

At step SP4, the wire electrical discharge machine 10 determines whether or not a machining end operation has been performed by the operator. When there is no machining end operation, the control of the wire electrical discharge machine 10 returns to step SP2. In this case, the application process of the voltage application unit 14 at step SP2 and the short-circuiting process of the short-circuiting unit 16 at step SP3 are continued. On the other hand, when there is a machining end operation, the wire electrical discharge machine 10 stops the output of the pulse signal SGL to the voltage application unit 14 and the short-circuiting unit 16, thereby stopping the application process of the voltage application unit 14 and the short-circuiting process of the short-circuiting unit 16. Thus, the processing of the wire electrical discharge machine 10 is ended.

[Modifications]

The above embodiment may be modified as follows.

[Modification 1]

In the above embodiment, the control section 32 (switching control section 38) sets the length of the short-circuiting period P3 according to the machining shape. That is, the short-circuiting period P3 having a different time length is set for each of the case where the machining shape is an outer corner (convex corner), the case where it is a straight line, and the case where it is an inner corner (concave corner). However, the control section 32 (switching control section 38) may set the length of the short-circuiting period P3 according to the curvature of the machining shape.

Generally, when the machining shape has a corner, the smaller the curvature of the corner, the higher the non-discharge frequency in the case of the outer corner and the lower the discharge frequency in the case of the inner corner, as compared to the case where the machining shape is a straight line. Therefore, by setting the length of the short-circuiting period P3 according to the curvature of the machining shape, even if there is a variation in the non-discharge frequency due to the curvature, the average voltage per unit time applied to the electrode gap between the workpiece W and the wire electrode 12 can be stabilized.

[Modification 2]

Figure 8:
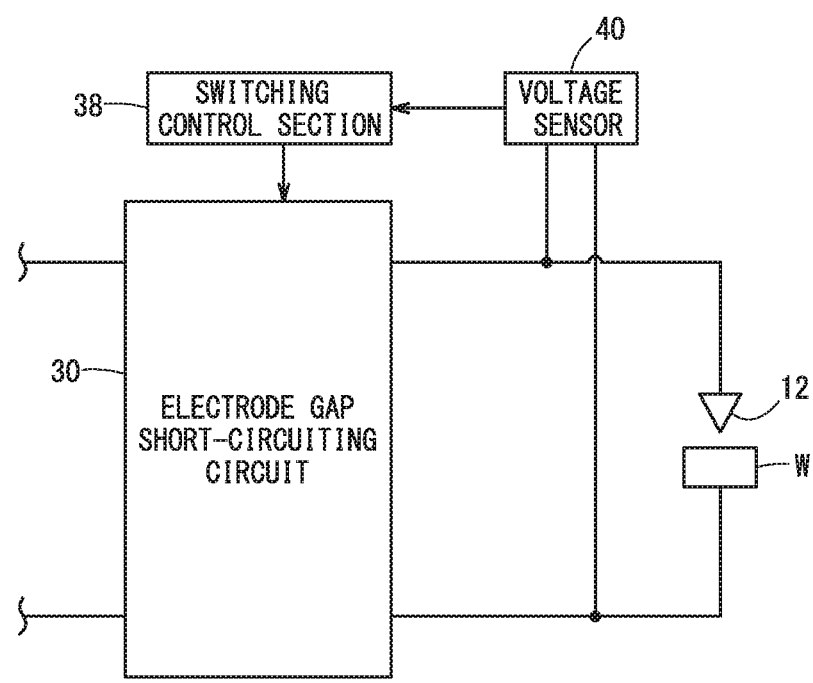
FIG. 8 is a diagram showing a partial configuration of a wire electrical discharge machine of Modification 2.

FIG. 8 is a diagram showing a part of the configuration of a wire electrical discharge machine of Modification 2. In FIG. 8, the same components as those described in the above embodiment are allotted with the same reference numerals. In this modification, the description overlapping with the above-described embodiment will be omitted.

In this modification, the wire electrical discharge machine 10 includes, in addition to the voltage application unit 14 (FIG. 1) and the short-circuiting unit 16 (FIG. 1) of the above embodiment, a voltage sensor 40 for detecting the voltage applied across the electrode gap between the workpiece W and the wire electrode 12.

In this modification, the switching control section 38 of the short-circuiting unit 16 is different from the above embodiment in that the voltage sensor 40 is used to adjust the short-circuiting period P3. That is, in the above embodiment, the switching control section 38 sets the short-circuiting period P3 according to the machining shape. On the other hand, in this modification, the switching control section 38 sets the short-circuiting period P3 according to the machining shape, and thereafter finely adjusts (compensates) the set short-circuiting period P3 so that the average voltage per unit time measured by the voltage sensor 40 will become a target value. This makes it possible to further stabilize the average voltage applied per unit time to the electrode gap.

[Modification 3]

The item which the switching control section 38 controls in the above modification 2 may be changed. That is, the switching control section 38 designates a target value of the average voltage applied per unit time to the electrode gap according to the machining shape, instead of setting the short-circuiting period P3 according to the machining shape. When the target value of the average voltage is designated, the switching control section 38 adjusts the short-circuiting period P3 so that the average voltage measured using the voltage sensor 40 will become the designated target value.

The switching control section 38 may set the target value such that the short-circuiting period P3 becomes longer when the machining shape assumes an outer corner compared to that for a straight line, and that the short-circuiting period P3 becomes shorter when the machining shape assumes an inner corner compared to that for a straight line. Further, the switching control section 38 may set the target value depending on the curvature of the machining shape.

As described above, the switching control section 38 sets the target value of the average voltage per unit time applied to the electrode gap according to the machining shape, and adjusts the short-circuiting period P3 so that the average voltage becomes the set target value, whereby it is possible to stabilize the average voltage per unit time applied to the electrode gap, as in the above embodiment.

[Modification 4]

In the above embodiment, the control section 32 adjusts the short-circuiting period P3 in accordance with the machining shape. However, the control section 32 may adjust the short-circuiting period P3 according to the average voltage applied per unit time to the electrode gap between the workpiece W and the wire electrode 12. This makes it possible to stabilize the average voltage applied per unit time to the electrode gap without analyzing the machining program.

The control section 32 may adjust the short-circuiting period P3 so that the average voltage applied to the electrode gap per unit time becomes a target value. This makes it possible to further stabilize the average voltage applied to the electrode gap per unit time.

[Modification 5]

In the above embodiment, the control section 32 (switching control section 38) short-circuits the electrode gap in all of the pause periods P2 that occur over time. However, the control section 32 (switching control section 38) may be configured to short-circuit the electrode gap in, not all but some of the multiple pause periods P2 that occur over time, such as only those for which a determination unit has determined that discharge will not occur. Here, the determination unit determines that discharge will not occur when the detection result from the voltage sensor for detecting the voltage applied across the electrode gap between the workpiece W and the wire electrode 12 does not become equal to or lower than a threshold until a predetermined time elapses from the end of the application period P1.

[Modification 6]

In the above embodiment, the short-circuiting period P3 ends at the end point of time of the pause period P2. However, the short-circuiting period P3 may terminate before the end point of time of the pause period P2, and also may terminate at a different point of time for each of the pause periods P2. Further, in the above embodiment, the short-circuiting period P3 starts at a different point of time for each of the pause periods P2. However, the short-circuiting period P3 may start at a fixed point after the lapse of a fixed time from the end point of the application period P1. The duration of the short-circuiting period P3 may be determined beforehand depending on the machining shape such that the residual voltage will be dropped to a desired value or lower by the electrode gap short-circuiting circuit 30.

[Modification 7]

Figure 9:
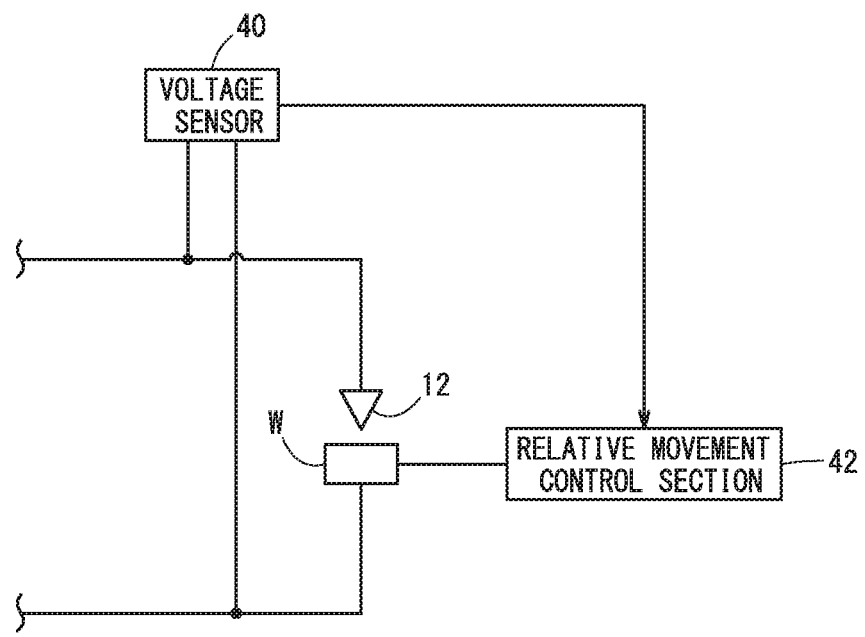
FIG. 9 is a diagram showing a partial configuration of a wire electrical discharge machine of Modification 7; and, FIG. 10 is a diagram for explaining a case of determining the speed of the relative movement when the wire electrode is moved relative to a workpiece.

FIG. 9 is a diagram showing a part of the configuration of a wire electrical discharge machine of Modification 7. In FIG. 9, the same components as those described in the above embodiment are allotted with the same reference numerals. It should be noted that, in this modification, the description overlapping with the above embodiment will be omitted.

In this modification, the wire electrical discharge machine 10 includes, in addition to the voltage application unit 14 (FIG. 1) and the short-circuiting unit 16 (FIG. 1) of the above embodiment, a voltage sensor 40 for detecting the voltage applied across the electrode gap between the workpiece W and the wire electrode 12, and a relative movement control section 42.

The relative movement control section 42 moves the wire electrode 12 relative to the workpiece W along a relative movement direction (at least one of the X-axis direction and the Y-axis direction) that intersects the running direction (Z-axis direction) of the wire electrode 12. The relative movement control section 42 controls at least one of the motor that drives the table to which the workpiece W is fixed and the motor that drives the die guides that support the wire electrode 12, to thereby move the wire electrode 12 relative to the workpiece W.

The relative movement control section 42 may move the wire electrode 12 relative to the workpiece W at a fixed relative movement speed or at a variable relative movement speed. A case where the relative movement control section 42 varies the relative movement speed will be described with reference to FIG. 10. In FIG. 10, it is assumed that the voltage is applied at a predetermined cycle, three times in a unit time.

The relative movement control section 42, based on the voltage detected by the voltage sensor 40, measures a time length (t1, t2, t3) from the application start time point to a time point at which the voltage becomes a specified voltage or below, for each of the multiple voltage pulses that are applied at a predetermined cycle in the unit time, and then obtains the total time length (t1+t2+t3). This total time length (t1+t2+t3) is named a first total.

Here, the time point at which the voltage becomes the specified voltage or below means, whichever comes first, the time when electrical discharge occurs or the time when the switching element S5 is turned on. When discharge occurs in the pause period P2, the time point at which the voltage becomes the specified voltage or below is the time point when discharge occurs. When no discharge occurs in the pause period P2, the time point at which the voltage becomes the specified voltage or below is the time point when the switching element S5 is turned on, that is, the time point when short-circuiting at the electrode gap is started. Note that, in FIG. 10, since discharge occurs in the first and third pause periods P2, the time point at which the voltage becomes the specified voltage or below, with regard to the first and third pause periods, is the time point at which discharge occurs. Further, in FIG. 10, since no discharge occurs in the second pause period P2, the time point at which the voltage becomes equal to or lower than the specified voltage, with regard to the second pause period, is the time when the switching element S5 is turned on.

The relative movement control section 42 also acquires the total (T1+T2+T3) of time lengths regarding the multiple voltage pulses that are applied at the predetermined cycle in the unit time, wherein the time length means a time length from the start of application to a time point when the switching element S5 is turned on. This total (T1+T2+T3) is named a second total. Note that the relative movement control section 42 may acquire the second total using the pulse signal SGL (FIG. 1), or may acquire the second total by reading the second total from the storage section 34 where the second total is stored beforehand.

When acquiring both the above first total and second total, the relative movement control section 42 determines the relative movement speed according to the ratio of the first total to the second total, and controls at least one of the motor that drives the table with the workpiece W fixed thereto and the motor that drives the die guides that support the wire electrode 12, so as to produce the determined relative movement speed.

In this way, the relative movement control section 42 creates relative movement between the wire electrode 12 and the workpiece W at the relative movement speed according to the ratio of the first total to the second total, whereby it is possible to generate appropriate electrical discharge at the electrode gap, compared to the case where the relative movement speed is kept constant.

[Modification 8]

The above-described embodiment and modification examples 1 to 7 may be arbitrarily combined as long as no contradiction occurs.

[Technical Ideas]

As the technical ideas that can be grasped from the above embodiment and modifications, the following first to fourth aspect of the invention will be described.

(First Invention)

According to a first invention, a wire electrical discharge machine (10) for performing electrical discharge machining on a workpiece (W) using a wire electrode (12) includes: a voltage application unit (14) configured to repeatedly apply a voltage to an electrode gap between the workpiece (W) and the wire electrode (12) at a predetermined cycle; a switching element (S5) connected in parallel with the electrode gap and configured to short-circuit the electrode gap; and a control section (32) configured to control the switching element (S5) so as to short-circuit the electrode gap in a pause period (P2) during which the voltage is not applied. The control section (32) is configured to adjust a short-circuiting period (P3) in which the electrode gap is short-circuited according to the machining shape specified by a machining program.

This configuration makes it possible to stabilize the average voltage applied per unit time to the electrode gap between the workpiece (W) and the wire electrode (12) even when the frequency at which electrical discharge does not occur varies depending on the machining shape.

The control section (32) may be configured to lengthen the short-circuiting period (P3) in the case that the machining shape is an outer corner (convex corner), compared to the short-circuiting period (P3) in the case that the machining shape is a straight line. This configuration makes it possible to stabilize the average voltage applied per unit time to the electrode gap between the workpiece (W) and the wire electrode (12) even when the frequency at which discharge does not occur differs between the case where the machining shape is a straight line and the case where the machining shape is an outer corner.

The control section (32) may be configured to shorten the short-circuiting period (P3) in the case that the machining shape is an inner corner (concave corner), compared to the short-circuiting period (P3) in the case that the machining shape is a straight line. This configuration makes it possible to stabilize the average voltage applied per unit time to the electrode gap between the workpiece (W) and the wire electrode (12) even when the frequency at which discharge does not occur differs between the case where the machining shape is a straight line and the case where the machining shape is an inner corner.

The control section (32) may be configured to adjust the short-circuiting period (P3) according to the curvature of the machining shape. This configuration makes it possible to stabilize the average voltage applied per unit time to the electrode gap between the workpiece (W) and the wire electrode (12) even when the frequency at which discharge does not occur varies depending on the curvature of the machining shape.

The wire electrical discharge machine (10) may further include a voltage sensor (40) configured to detect the voltage across the electrode gap, and the control section (32) may be configured to set a target value of the average voltage applied per unit time to the electrode gap according to the machining shape, and adjust the short-circuiting period (P3) so that the average voltage measured using the voltage sensor (40) becomes equal to the target value. This configuration makes it possible to stabilize the average voltage applied per unit time to the electrode gap between the workpiece (W) and the wire electrode (12) even when the frequency at which discharge does not occur varies depending on the machining shape.

The wire electrical discharge machine (10) may further include a voltage sensor (40) configured to detect the voltage across the electrode gap, and the control section (32) may be configured to set the short-circuit period (P3) according to the machining shape, and adjust the set short-circuiting period (P3) so that the average voltage per unit time measured using the voltage sensor (40) becomes equal to a target value. As a result, the short-circuiting period (P3) set according to the machining shape can be finely adjusted, so that the average voltage applied per unit time to the electrode gap between the electrodes can be further stabilized.

The control section (32) may be configured to control the switching element (S5) so as to short-circuit the electrode gap in all the pause periods (P2) that occur over time. This makes it possible to surely take out the electric charge that would remain at the electrode gap if electrical discharge does not occur.

The wire electrical discharge machine (10) may further include a relative movement control section (42) configured to relatively move the wire electrode (12) relative to the workpiece (W), and the relative movement control section (42) may be configured to determine the relative movement speed when the wire electrode (12) is moved relative to the workpiece (W) according to the ratio of the total of first time lengths to the total of second time lengths regarding the multiple voltages which are applied at the predetermined cycle in a unit time, wherein the first time length means a time length from the application start time point of the voltage to a time point when electrical discharge occurs or a time point when the switching element (S5) is turned on, whichever comes first, and the second time length means a time length from the application start time point of the voltage to the time point when the switching element (S5) is turned on. This configuration makes it possible to appropriately generate electrical discharge at the electrode gap, compared to the case where the relative movement speed is kept constant.

(Second Invention)

According to a second invention, a wire electrical discharge machine (10) for performing electrical discharge machining on a workpiece (W) using a wire electrode (12) includes: a voltage application unit (14) configured to repeatedly apply a voltage to an electrode gap between the workpiece (W) and the wire electrode (12) at a predetermined cycle; a switching element (S5) connected in parallel with the electrode gap and configured to short-circuit the electrode gap; a voltage sensor (40) configured to detect the voltage applied to the electrode gap; and a control section (32) configured to control the switching element (S5) so as to short-circuit the electrode gap in a pause period (P2) during which the voltage is not applied. The control section (32) is configured to adjust a short-circuiting period (P3) in which the electrode gap is short-circuited according to the average voltage per unit time measured using the voltage sensor (40).

This configuration makes it possible to stabilize the average voltage applied per unit time to the electrode gap between the workpiece (W) and the wire electrode (12).

The control section (32) may be configured to adjust the short-circuiting period (P3) so that the average voltage becomes equal a target value. This configuration can further stabilize the average voltage applied per unit time to the electrode gap.

The control section (32) may be configured to control the switching element (S5) so as to short-circuit the electrode gap in all the pause periods (P2) that occur over time. This makes it possible to surely take out the electric charge that would remain at the electrode gap if electrical discharge does not occur.

The wire electrical discharge machine (10) may further include a relative movement control section (42) configured to relatively move the wire electrode (12) relative to the workpiece (W), and the relative movement control section (42) may be configured to determine the relative movement speed at which the wire electrode (12) is moved relative to the workpiece (W) according to the ratio of the total of first time lengths to the total of second time lengths regarding the multiple voltages which are applied at the predetermined cycle in a unit time, wherein the first time length means a time length from the application start time point of the voltage to a time point when electrical discharge occurs or a time point when the switching element (S5) is turned on, whichever comes first, and the second time length means a time length from the application start time point of the voltage to the time point when the switching element (S5) is turned on. This configuration makes it possible to appropriately generate electrical discharge at the electrode gap, compared to the case where the relative movement speed is kept constant.

(Third Invention)

According to a third invention, a control method of a wire electrical discharge machine (10) for performing electrical discharge machining on a workpiece (W) using a wire electrode (12) includes: a voltage application step of repeatedly applying a voltage to an electrode gap between the workpiece (W) and the wire electrode (12) at a predetermined cycle; and a control step of controlling a switching element (S5) connected in parallel with the electrode gap, so as to short-circuit the electrode gap in a pause period (P2) during which the voltage is not applied, and the control step adjusts a short-circuiting period (P3) in which the electrode gap is short-circuited according to the machining shape specified by a machining program.

This configuration makes it possible to stabilize the average voltage applied per unit time to the electrode gap between the workpiece (W) and the wire electrode (12) even when the frequency at which electrical discharge does not occur varies depending on the machining shape.

(Fourth Invention)

According to a fourth invention, a control method of a wire electrical discharge machine (10) for performing electrical discharge machining on a workpiece (W) using a wire electrode (12) includes: a voltage application step of repeatedly applying a voltage to an electrode gap between the workpiece (W) and the wire electrode (12) at a predetermined cycle; and a control step of controlling a switching element (S5) connected in parallel with the electrode gap, so as to short-circuit the electrode gap in a pause period (P2) during which the voltage is not applied, and the control step adjusts a short-circuiting period (P3) in which the electrode gap is short-circuited according to the average voltage per unit time measured using a voltage sensor (40) configured to detect the voltage applied to the electrode gap.

This configuration makes it possible to stabilize the average voltage applied per unit time to the electrode gap between the workpiece (W) and the wire electrode (12).

The present invention is not particularly limited to the embodiment described above, and various modifications are possible without departing from the essence and gist of the present invention.

What is claimed is:

1. A wire electrical discharge machine for performing electrical discharge machining on a workpiece using a wire electrode, comprising:
   a voltage supply configured to repeatedly apply a voltage to an electrode gap between the workpiece and the wire electrode at a predetermined cycle;
   a switch connected in parallel with the electrode gap and configured to short-circuit the electrode gap; and
   a controller configured to control the switch so as to short-circuit the electrode gap in a pause period during which the voltage is not applied,
   wherein the controller is configured to adjust a short-circuiting period in which the electrode gap is short-circuited according to a machining shape specified by a machining program stored in a non-transitory computer readable medium.

2. The wire electrical discharge machine according to claim 1, wherein the controller is configured to lengthen the short-circuiting period in a case that the machining shape is an outer corner, compared to the short-circuiting period in a case that the machining shape is a straight line.

3. The wire electrical discharge machine according to claim 1, wherein the controller is configured to shorten the short-circuiting period in a case that the machining shape is an inner corner, compared to the short-circuiting period in a case that the machining shape is a straight line.

4. The wire electrical discharge machine according to claim 1, wherein the controller is configured to adjust the short-circuiting period according to a curvature of the machining shape.

5. The wire electrical discharge machine according to claim 1, further comprising a voltage sensor configured to detect the voltage across the electrode gap,
   wherein the controller is configured to set a target value of an average voltage applied per unit time to the electrode gap according to the machining shape, and adjust the short-circuiting period so that the average voltage measured using the voltage sensor becomes equal to the target value.

6. The wire electrical discharge machine according to claim 1, further comprising a voltage sensor configured to detect the voltage across the electrode gap,
wherein the controller is configured to set the short-circuit period according to the machining shape, and adjust the set short-circuiting period so that an average voltage per unit time measured using the voltage sensor becomes equal to a target value.

7. The wire electrical discharge machine according to claim 1, wherein the controller is configured to control the switch so as to short-circuit the electrode gap in all the pause periods that occur over time.

8. The wire electrical discharge machine according to claim 1, further comprising a relative movement controller configured to relatively move the wire electrode relative to the workpiece,
wherein the relative movement controller is configured to determine a relative movement speed at which the wire electrode is moved relative to the workpiece, according to a ratio of total of first time lengths to total of second time lengths regarding the multiple voltages which are applied at the predetermined cycle in a unit time, the first time length means a time length from an application start time point of the voltage to a time point when electrical discharge occurs or a time point when the switch is turned on, whichever comes first, and the second time length means a time length from the application start time point of the voltage to the time point when the switch is turned on.

9. The wire electrical discharge machine according to claim 1, wherein the controller is configured to adjust a short-circuiting period in which the electrode gap is short-circuited according to the machining shape comprising a type of shape recognized from the machining program.

10. The wire electrical discharge machine according to claim 1, further comprising a discharge resistor connected in series with the switch and the wire electrode.

11. The wire electrical discharge machine according to claim 1, wherein the controller is configured to analyze the machining program to determine the machining shape and control the switch to short-circuit the electrode gap in the short-circuit period.

12. The wire electrical discharge machine according to claim 11, wherein the short circuit period is within the pause period during which the voltage is not applied.

13. A wire electrical discharge machine for performing electrical discharge machining on a workpiece using a wire electrode, comprising:
a voltage supply configured to repeatedly apply a voltage to an electrode gap between the workpiece and the wire electrode at a predetermined cycle;
a switch connected in parallel with the electrode gap and configured to short-circuit the electrode gap;
a voltage sensor configured to detect the voltage applied to the electrode gap; and
a controller configured to control the switch so as to short-circuit the electrode gap in a pause period during which the voltage is not applied,
wherein the controller is configured to adjust a short-circuiting period in which the electrode gap is short-circuited according to an average voltage per unit time measured using the voltage sensor.

14. The wire electrical discharge machine according to claim 13, wherein the controller is configured to adjust the short-circuiting period so that the average voltage becomes equal to a target value.

15. A control method of a wire electrical discharge machine for performing electrical discharge machining on a workpiece using a wire electrode, comprising:
a voltage application step of repeatedly applying a voltage to an electrode gap between the workpiece and the wire electrode at a predetermined cycle; and,
a control step of controlling a switch connected in parallel with the electrode gap, so as to short-circuit the electrode gap in a pause period during which the voltage is not applied,
wherein the control step adjusts a short-circuiting period in which the electrode gap is short-circuited according to a machining shape specified by a machining program stored in a non-transitory computer readable medium.

16. The control method according to claim 15, wherein the control step includes adjusting the short-circuiting period in which the electrode gap is short-circuited according to the machining shape comprising a type of shape recognized from the machining program.

17. The control method according to claim 15, wherein the control step of controlling the switch connected in parallel with the electrode gap to short-circuit the electrode gap in a short-circuiting period and discharge electric charge accumulated in the electrode gap according to a discharge resistor connected in series with the switch and the wire electrode.

18. The control method according to claim 17, wherein the short circuit period is within a pause period during which the voltage is not applied, and
wherein the control step includes analyzing the machining program to determine the machining shape and control the switch to short-circuit the electrode gap in the short-circuit period.

19. A control method of a wire electrical discharge machine for performing electrical discharge machining on a workpiece using a wire electrode, comprising:
a voltage application step of repeatedly applying a voltage to an electrode gap between the workpiece and the wire electrode at a predetermined cycle; and,
a control step of controlling a switch connected in parallel with the electrode gap, so as to short-circuit the electrode gap in a pause period during which the voltage is not applied,
wherein the control step adjusts a short-circuiting period in which the electrode gap is short-circuited according to an average voltage per unit time measured using a voltage sensor configured to detect the voltage applied to the electrode gap.

20. The control method according to claim 19, wherein the control step includes adjusting the short-circuiting period in which the electrode gap is short-circuited according to the machining shape comprising a type of shape recognized from a program stored in a non-transitory computer readable medium,
wherein the control step of controlling the switch connected in parallel with the electrode gap to short-circuit the electrode gap in a short-circuiting period and discharge electric charge accumulated in the electrode gap by a discharge resister connected in series with the switch and the wire electrode,
wherein the short circuit period is within a pause period during which the voltage is not applied, and wherein the control step includes analyzing the program to determine the machine shape and control the switch to short-circuit the electrode gap in the short-circuit period.

* * * * *